United States Patent [19]

Johansson

[11] Patent Number: 5,161,517

[45] Date of Patent: Nov. 10, 1992

[54] STEAM GENERATOR FOR A CONVECTION OVEN

[75] Inventor: Leif A. T. Johansson, Djursholm, Sweden

[73] Assignee: Revent International AB, Sweden

[21] Appl. No.: 702,604

[22] Filed: May 17, 1991

[30] Foreign Application Priority Data

May 17, 1990 [SE] Sweden .................................. 9001789

[51] Int. Cl.⁵ .......................... A21B 1/00; F24C 15/32
[52] U.S. Cl. ...................................... 126/20; 126/469; 126/400; 165/902
[58] Field of Search .......................... 126/20, 20.1, 20.2, 126/369.1, 369.2, 369.3, 369, 348, 400; 165/902, 901, 6

[56]     References Cited
      U.S. PATENT DOCUMENTS

| 4,202,259 | 5/1990 | Johansson |           |
|-----------|--------|-----------|-----------|
| 4,378,005 | 3/1983 | Otto      | 126/400 X |
| 4,612,974 | 9/1986 | Yanadori et al. | 126/400 X |
| 4,689,303 | 8/1987 | Kraft et al. | 126/21 A X |
| 4,785,151 | 11/1988 | Voegtlin | 126/21 A X |

Primary Examiner—Larry Jones
Attorney, Agent, or Firm—Andrus, Sceales, Starke & Sawall

[57]     ABSTRACT

A steam generator for a convection oven through the oven chamber of which heated air is circulated by means of a fan along a flow path in which the steam generator is positioned, comprises a heat-storage unit having a stack of elongated horizontal supports for supporting ball-shaped heat-storage bodies and means for spreading water over the heat-storage unit. Each support includes a bottom wall having a plurality of polygonal apertures which form seats for respective ones of the heat-storage bodies. The apertures, the size of which is substantially smaller than the largest cross-section of the heat-storage bodies, form flow passages through which water from overlying supports is passed to the top portion of the heat-storage bodies of underlying supports.

15 Claims, 2 Drawing Sheets

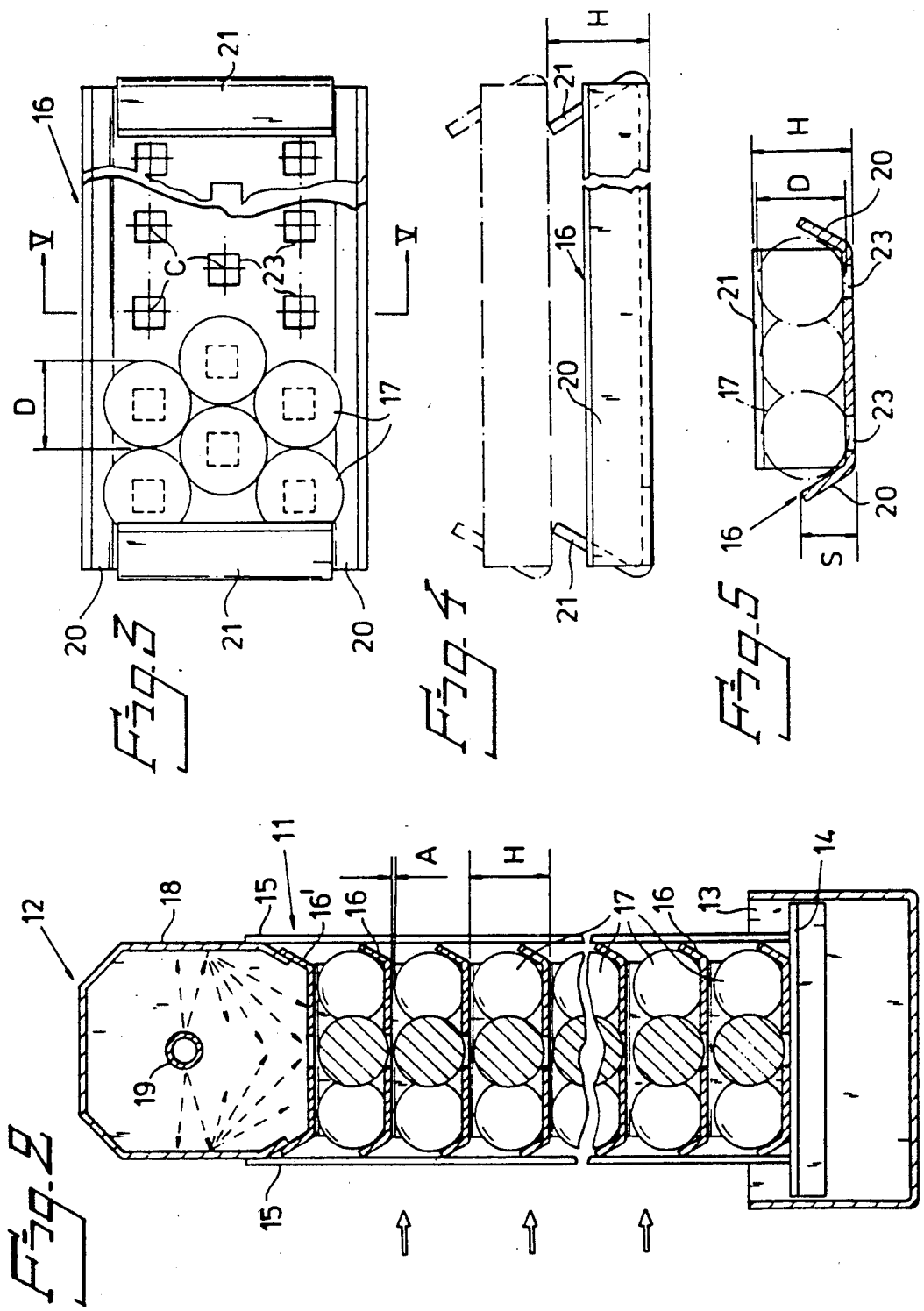

STEAM GENERATOR FOR A CONVECTION OVEN

BACKGROUND OF THE INVENTION

1. Field of the Invention

This invention relates to a steam generator for use in a convection oven. More particularly, the invention concerns a regenerative steam generator comprising a heat-storage unit adapted to be charged with heat from flowing heated air contacting the heat-storage unit and to be discharged by water which is spread over it so as to be converted to steam.

2. Prior Art

A steam generator of the above-mentioned kind is disclosed in U.S. Pat. No. 4,202,259. By means of a steam generator of the kind described in this patent, large amounts of water can be evaporated within a short period of time following the charging of the heat-storage unit, and the charging of the heat-storage unit with heat can also be effected rapidly so that a sufficient amount of heat is stored the next time steam is required.

SUMMARY OF THE INVENTION

A general object of the present invention is to provide an improved steam generator of the kind indicated above. A more particular object is to provide a steam generator which can be produced economically and utilizes the heat-storage mass of the heat-storage unit efficiently so that the charging and discharging can take place rapidly even when large amounts of water are required.

These and other objects and advantages of the invention will be better understood from the following description of a preferred embodiment with reference to the accompanying drawings.

BRIEF DESCRIPTION OF THE DRAWINGS

FIG. 2 is a vertical sectional view of the steam generator shown in FIG. 1, the section being taken in a plane which is perpendicular to the frontal or major plane of the heat-storage unit;

FIG. 3 is a plan view of one of the supports which the heat-storage unit of the steam generator comprises;

FIG. 4 is a side view of the support shown in FIG. 3;

FIG. 5 is a view of the support in cross-section taken on line V—V of FIG. 3.

DETAILED DESCRIPTION

Figure 1:
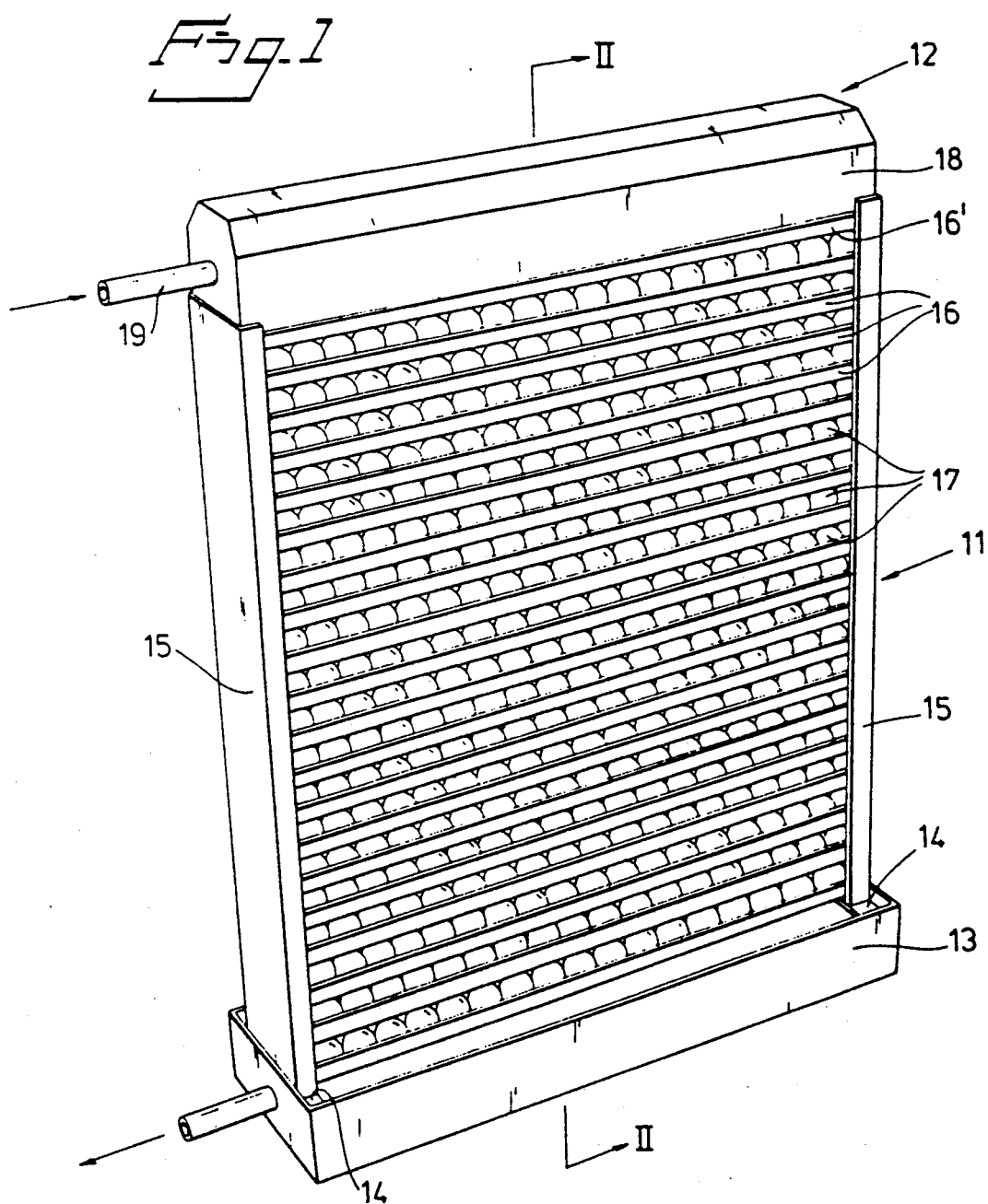
FIG. 1 is a diagrammatic perspective view of a steam generator according to the invention.

The regenerative steam generator shown in FIG. 1 forms part of a discontinuous convection oven which is not shown, namely, a baking oven of the rack-oven type. Such ovens comprise an oven chamber through which heated air circulated by means of a fan flows horizontally during the baking process to contact loaves of bread supported on baking plates stacked on a movable rack accommodated in the oven chamber. The heated air flows along a closed flow path extending through the oven chamber, and in the course of its circulation through the oven, the heated air passes through the heat-storage unit of the steam generator substantially perpendicularly to the major plane of the heat-storage unit, as is indicated by arrows in FIG. 2.

For a more detailed description of the oven and an example of the position of the steam generator in the oven, reference is made to the above-mentioned patent the disclosure of which is incorporated herein by reference.

As illustrated in the drawings, the steam generator of the invention comprises a heat-storage unit 11 which, like the heat-storage unit of the above-mentioned prior-art steam generator, may be regarded as a generally two-dimensional, flat, erect structure, in that its height and width are several times its thickness or depth as measured in the direction of flow of air through it. Moreover, the steam generator comprises a water spraying unit 12 disposed along the horizontal upper side of the heat-storage unit 11, and a sump 13 disposed beneath the heat-storage unit for collecting and draining away excess water flowing from the heat-storage unit. A pair of horizontal brackets 14 secured to the inner side of the end walls of the sump support the heat-storage unit 11.

The heat-storage unit 11 is comprised of a pair of side posts 15 and a plurality of horizontal supports 16 which are loosely stacked between the side posts and each of which supports a layer of heat-storage bodies in the shape of balls 17 of steel or other metal.

The side posts 15 of the heat-storage unit are formed by a pair of channel members the channels of which face one another. The end portions of the supports 16 are received in the spaces between the flanges of the side posts, and the lowermost support rests on the brackets 14 in the sump 13 while each of the other supports rests on the next lower support.

The water spraying unit 12 comprises an elongate hood or cover 18 and a water-spray tube 19 disposed within the hood and extending throughout the width or length of the heat-storage unit 11. A portion of the water spraying unit is inserted between the side posts 15 with the lower marginal portion of the hood 18 being received in the uppermost support 16' as shown in FIG. 2. Outlet openings are provided along the length of the water-spray tube 19 and through these openings water is sprayed onto and distributed over the inside of the side walls of the hood so as to splash and flow over the uppermost support. In FIG. 2, this support is shown without heat-storage balls.

Essential features of the steam generator according to the invention relate to the supports 16. These features are illustrated in FIGS. 2–5 and will be described hereinafter.

Each support 16 is made from a flat piece of steel sheet the longitudinal marginal portions of which are bent about 60° upwardly to form outwardly slanting side walls 20 the height of which is designated by S. The end portions are bent about 120° upwardly and inwardly to form inwardly slanting end walls 21 the height of which is designated by H. These end walls extend upwardly to a greater height than the side walls 20 and their upper edges form a support or rest for the next upper support 16 as indicated in phantom lines in FIG. 4. Suitably, the height S of the side walls is at least 0.4–0.6 times the vertical distance (=H) between corresponding points on adjacent supports; the side walls can then effectively limit the splashing of water outwardly to the sides from the heat-storage unit 11 without unduly restricting the flow-through passages for the air. If large amounts of water are supplied to the heat-storage unit 11, the height of the side walls may suitably be even greater.

Throughout its extent between the end and side walls, the flat horizontal bottom wall 22 of the support is provided, preferably through punching, with through holes or apertures 23, which are non-circular in plan view. In the illustrated embodiment, the apertures are shaped like regular polygons, namely squares, but they can also take other shapes. As shown in FIG. 3, these apertures are arranged in a plurality of, i.e. three, parallel longitudinal rows such that the horizontal distances from the center C of each aperture to the centers of the adjacent apertures are equal. Apart from the apertures 23, the bottom wall 22 is solid.

Each aperture 23 forms a seat for one of the balls 17 and also defines a water flow passage, the ball restricting the open portion or area of the flow passage to a fraction of the total area of the aperture.

The supports 16 are adapted to receive a ball 17 in each seat or aperture 23, the balls on each support preferably being of equal size and of a diameter D such that adjacent balls 17 engage one another or are very closely spaced, and at the same time the distance A between the balls and the underside of the next upper support, i.e., the vertical distance H between corresponding points on adjacent supports, is as short as possible (the distance A may be zero or even, if the balls 17 extend into the apertures 23 of the next upper support 16, negative). Accordingly, the combined heat-storage mass formed by the balls 17 is as large as possible for a given total volume of the heat-storage unit 11.

All supports 16 are identical, and the apertures 23 of all supports and, consequently, the balls 17 received in the apertures, are vertically aligned in the heat-storage unit 11 throughout the height thereof.

When water is spread over the heat-storage unit from the spray tube 19, the water is distributed substantially evenly over the apertures 23 in the uppermost support 16'. As there are no balls in this support, the water can flow relatively freely through the apertures onto the balls 17 on the next lower support. Because each aperture 23 in the uppermost support 16' is directly above a ball 17, the water will be spread substantially evenly over the top surface of the ball. Water that is not immediately evaporated flows down the balls to the open portions of the apertures 23 in the bottom wall of the support on which the balls are positioned.

As the apertures 23 in the bottom wall 22 are small in comparison with the diameter of the balls, the water will flow from the second highest support 16 down to the underlying balls 17 relatively close to the top portions of these balls so that the water is again spread evenly over the entire top surface of the balls.

Similarly, the water is spread evenly over the balls 17 on the following supports 16 until all water has been evaporated or until the excess water reaches the lowermost support 16 and flows into the sump 13.

Because the water is evenly spread over the balls 17, the stored heat can be utilized very efficiently for the steam production, and at the same time the undesirable splashing of water to the sides from the heat-storage unit 11 is minimized.

For reasons of production economy it is advantageous to make the apertures of all supports of equal size and to use balls of the same size throughout the heat-storage unit 11 as in the described and illustrated embodiment. Functionally, this is also quite satisfactory for most practical purposes. However, it is within the scope of the invention to provide different shapes and/or sizes of the apertures, and/or different ball sizes, for different supports. By suitably selecting these parameters it is possible to accomplish a certain regulation of the water flow so that the distribution of the water over the height of the heat-storage unit corresponds as closely as possible to the desired distribution.

In order that the water flow through the apertures in the supports may take place as close to the tops of the underlying balls as possible, the apertures should be as small as possible. On the other hand, in order that the flow of water through the apertures may not be too restricted, the apertures must not be too small. For practical purposes, in the illustrated embodiment, the length B of the polygon sides of the apertures suitably is 0.2–0.6, preferably 0.2–0.4, times the ball diameter D.

In a modification (not shown) of the supports 16 of the heat-storage unit 11, the end walls 21 of the supports are omitted. With this modification, the lowermost support 16 rests on the brackets 14 as in the illustrated embodiment, while each of the other supports 16 rests on the layer of balls 17 on the next lower support 16. This embodiment is advantageous in that the production steps required for the bending of the end walls 21 of the illustrated embodiment are superfluous and in that material is saved.

If the number of stacked supports 16 in the heat-storage unit 11 is large, it may be advantageous to leave a few of the apertures 23 in those supports 16 which are located in the upper portion of the heat-storage unit, e.g. every five apertures 23 in the middle row of apertures, empty of the balls 17. A portion of the water supplied from the water spraying unit 12 can then quickly reach the lower supports of the heat-storage unit. Naturally, it is also possible within the scope of the invention to provide for the same purpose special openings in the bottom walls of the upper supports, but the first-mentioned solution to the problem of rapidly distributing the water throughout the height of the heat-storage unit 11 is preferred.

What I claim is:

1. A regenerative steam generator for a discontinuous convection oven having an oven chamber and a flow path for heated air moved by means of a fan, the flow path extending through the oven chamber and the steam generator being positioned in the flow path, said steam generator comprising: a heat storage unit including a plurality of elongated, substantially horizontal, superposed supports; a plurality of ball-shaped heat-storage bodies on said supports; and means for spreading water over the heat-storage bodies, each of said supports comprising a bottom wall having a plurality of seats which are distributed substantially uniformly over the entire bottom wall, each seat being receptive of one of said heat-storage bodies and formed by a non-circular aperture through the bottom wall, the size of the aperture being substantially smaller than the largest cross-section of the heat-storage body.

2. A steam generator as claimed in claim 1 in which the apertures are regularly polygonal in plan view, the length of each polygon side being 0.2–0.6 times the diameter of the heat-storage bodies.

3. A steam generator as claimed in claim 2 in which the apertures are square.

4. A steam generator as claimed in claim 1 in which the apertures are arranged in a plurality of longitudinally extending parallel rows.

5. A steam generator as claimed in claim 1 or as claimed in claim 4 in which the heat-storage bodies on each support are of approximately the same diameter and in which the horizontal center-to-center (C) distance between the apertures of the support is substantially equal to the diameter (D) of the heat-storage bodies.

6. A steam generator as claimed in claim 1 in which the apertures of the supports are arranged in a plurality of vertical columns whereby each aperture is vertically aligned with an aperture of underlying and overlying supports.

7. A steam generator as claimed in claim 1 in which the supports are in the shape of troughs having a substantially flat bottom wall which is solid apart from said apertures.

8. A steam generator as claimed in claim 1 in which each support except the lowermost one rests on the next lower support.

9. A regenerative steam generator for a discontinuous convection oven having an oven chamber and a flow path for heated air moved by means of a fan, the flow path extending through the oven chamber and the steam generator being positioned in the flow path, said steam generator comprising: a heat storage unit including a plurality of elongated, substantially horizontal, superposed supports; a plurality of ball-shaped heat-storage bodies on said supports; and means for spreading water over the heat-storage bodies, each of said supports comprising a bottom wall having a plurality of seats which are distributed substantially over the entire bottom wall, each seat being receptive of one of said heat-storage bodies and formed by a non-circular aperture through the bottom wall, the size of the aperture being substantially smaller than the largest cross-section of the heat-storage body, and wherein each support is made from an elongated metal sheet the longitudinal marginal portions of which are bent upwardly to form longitudinal side walls of the support and the end portions of which are bent upwardly to form end walls of the support.

10. A steam generator as claimed in claim 9 in which the height (S) of the side walls is 0.4–0.6 times the vertical distance (H) between adjacent supports.

11. A steam generator as claimed in claim 10 in which the vertical distance (H) between adjacent supports is only slightly greater than the diameter (D) of the heat-storage bodies.

12. A steam generator as claimed in claim 10 in which the bottom wall of each support except the lowermost one engages the top edge of the end walls of the next lower support.

13. A regenerative steam generator for a discontinuous convection open having an oven chamber and a flow path for heated air moved by means of a fan, the flow path extending through the oven chamber and the steam generator being positioned in the flow path, said stream generator comprising: a heat storage unit including a plurality of elongated, substantially horizontal, superposed supports; a plurality of ball-shaped heat-storage bodies on said supports; and means for spreading water over the heat-storage bodies, each of said supports comprising a bottom wall having a plurality of seats which are distributed substantially uniformly over the entire bottom wall, each seat being receptive of one of said heat-storage bodies and formed by a non-circular aperture through the bottom wall, the size of the aperture being substantially smaller than the largest cross-section of the heat-storage body, and wherein the supports are in the shape of troughs having a substantially flat bottom wall which is solid apart from said apertures, and each support is made from an elongated metal sheet the longitudinal marginal portions of which are bent upwardly to form longitudinal side walls of the support and the end portions of which are bent upwardly to form end walls of the support.

14. A steam generator as claimed in claim 13 in which the height (S) of the side walls is 0.4–0.6 times the vertical distance (H) between adjacent supports.

15. A steam generator as claimed in claim 14 in which the vertical distance (H) between adjacent supports is only slightly greater than the diameter (D) of the heat-storage bodies.

* * * * *

UNITED STATES PATENT AND TRADEMARK OFFICE
CERTIFICATE OF CORRECTION

PATENT NO. : 5,161,517
DATED    : November 10, 1992
INVENTOR(S) : Leif A. T. Johansson It is certified that error appears in the above-identified patent and that said Letters Patent is hereby corrected as shown below:

| | |
|---|---|
| Claim 9, Column 5, Line 27 | After the word "substantially" insert --- uniformly --- |
| Claim 13 Column 6, Line 10 | Delete "open" and substitute therefore --- oven --- |
| Claim 13 Column 6, Line 14 | Delete "stream" and substitute therefore --- steam --- |

Signed and Sealed this

Twenty-eighth Day of September, 1993

*Attest:*

BRUCE LEHMAN

*Attesting Officer*     *Commissioner of Patents and Trademarks*